United States Patent [19]

Neuwirth et al.

[11] 4,027,303
[45] May 31, 1977

[54] APPARATUS FOR DETECTING THE PRESENCE OF OBJECTS BY SENSING REFLECTED ENERGY

[76] Inventors: Karl R. Neuwirth, 736 Chemowa Court, Sunnyvale, Calif. 94087; Malcolm E. Milligan, 1250 Schneider Road, North Canton, Ohio 44720

[22] Filed: May 22, 1975

[21] Appl. No.: 579,959

[52] U.S. Cl. .................. 340/258 D; 340/258 C; 343/5 PD
[51] Int. Cl.² .................. G01S 9/02; G08B 13/24
[58] Field of Search ............. 343/5 PD; 340/258 C, 340/258 D

[56] References Cited

UNITED STATES PATENTS

| | | | |
|---|---|---|---|
| 3,237,105 | 2/1966 | Kalmus | 340/258 C |
| 3,541,551 | 11/1970 | Bystrom, Jr. et al. | 343/5 PD |
| 3,680,074 | 7/1972 | Lieser | 343/5 PD X |
| 3,691,556 | 9/1972 | Bloice | 343/5 PD |
| 3,733,602 | 5/1973 | Cuckler et al. | 343/5 PD |
| 3,747,109 | 7/1973 | Corbell et al. | 343/5 PD |
| 3,750,165 | 7/1973 | Bailey et al. | 343/5 PD |
| 3,801,978 | 4/1974 | Gershberg et al. | 343/5 PD X |
| 3,854,132 | 12/1974 | Davies | 343/5 PD |
| 3,863,240 | 1/1975 | Galvin | 340/258 C |
| 3,877,002 | 4/1975 | Cheal et al. | 343/5 PD X |
| 3,886,549 | 5/1975 | Cheal et al. | 343/5 PD X |

*Primary Examiner*—Malcolm F. Hubler
*Attorney, Agent, or Firm*—Jack M. Wiseman

[57] ABSTRACT

Apparatus for detecting the presence of an object by propagating an electromagnetic field, preferably in the microwave range. An object entering the path of the electromagnetic field reflects, disturbs or interrupts electromagnetic energy. The level of the electromagnetic energy reflected, disturbed, or interrupted depends on the size of the object and the distance of the object from the apparatus. A receiver detects the level of the electro-magnetic energy reflected, disturbed or interrupted from the object. An alarm is set to be activated when the energy level of the reflected, disturbed or interrupted energy detected by the receiver reaches a predetermined level.

7 Claims, 9 Drawing Figures

Fig_5

Fig_6

Fig_7

APPARATUS FOR DETECTING THE PRESENCE OF OBJECTS BY SENSING REFLECTED ENERGY

BACKGROUND OF THE INVENTION

The present invention relates to apparatus for detecting objects, and more particularly to apparatus for detecting the presence or absence of objects by sensing reflected, disturbed or interrupted electromagnetic energy.

Heretofore, a transmitter emitted pulses of electromagnetic energy, which were refected off an object. A receiver detected the reflected electromagnetic energy and determined the distance of the object by measuring the time interval between the receiving of the reflected electromagnetic energy. The direction of the object was determined by the antenna location at the time of the transmission of the electromagnetic signal and at the time of receiving the electromagnetic signal.

In radar systems of this type, the receiver detected reflected pulse signals between transmitted pulse signals. As the range of the object was reduced, the time interval between transmitted and received pulses was shorter, which was more difficult to be observed by a operator. The reduction of pulse intervals required a shorter pulse width. Thus, pulse radar systems were not practical for use at close distances.

Radar systems were rather complex and expensive to manufacture. Such systems required large bandwidths for the intermediate frequency amplifiers to pass the pulsed signals and a local oscillator. Additionally, range gating magnetron and/or klystron tubes were required, which also were rather expensive. It was difficult to achieve large system gains and small bandwidths for the receiver.

Generally, the radar transmitter and the radar receiver employed a common antenna. As a consequence thereof, the scope of the directions covered was a function of the antenna beam width and antenna pointing position. To cover a wide scope of directions or segments of directions the antenna was rotated.

Doppler radar systems had transmitted electromagnetic signals continuously of a selected frequency, which signals were reflected from an object. A receiver detected the electromagnetic signal and recorded the frequency of the reflected electromagnetic signal. According to the Doppler effect, an object in motion will cause a variation in the frequency so that the reflected electromagnetic signal was different in frequency from the transmitted electromagnetic signal. Thus, the frequency of the reflected signal detected by the receiver was different from the frequency transmitted when the object was in motion. Thus, detection under this radar system required an object in motion.

The Doppler radar system required a sampling of radio frequency signals for a mixer action. Therefore, the transmitter and the receiver were generally at the same location and used a common antenna. Hence, the scope of the direction covered was a function of the antenna beam width and antenna pointing system. To cover a wide scope of direction or segments of directions, the antenna was rotated. In the Doppler radar system, it was the object that must be in motion. A moving antenna produced false readings. Excessive vibrating motion imparted to the Doppler radar system resulted in false readings.

When a transmitter and a receiver of a radar system were in close proximity to one another, a common antenna was generally used. Spatial coverage was then limited to the direction the antenna was pointed or can be pointed and the beam width of the antenna.

Additionally, field disturbance sensors have been heretofore employed, which were microwave intrusin sensors and devices that use R.F. energy for production line counting and sensing. Such field disturbance sensors have been pulse operated.

SUMMARY OF THE INVENTION

An object detection apparatus in which an electromagnetic field is propagated. An object in the path of the electromagnetic field effects a level of electromagnetic energy in accordance with the size thereof and the distance of the object from the apparatus. A receiver detects the level of electromagnetic energy influenced by the object to effect a control operation when a predetermined energy level is detected by the receiver.

By virtue of the present invention, objects within relatively close distances of the apparatus can be detected. The apparatus can detect objects approaching zero distance, since the need for a range gate or pulse width requirements has been obviated. Additionally, the apparatus senses an object when the object is in motion or when the object is at rest.

Also, the transmitter and the receiver can be placed either in close proximity to one another or separated from one another by a substantial distance. A plurality of transmitters and receivers can be operated to obtain a desired spatial detection. Simultaneous and instantaneous coverage of an area or space is performed by the plurality of transmitters and receivers rather than by the antenna pointing, switching or scanning. Thus, flexibility to cover any prescribed condition is available.

The apparatus can operate under vibrating conditions, since angular or linear displacement or motion is not essential for the detection operation. An alarm is activated when the receiver detects a predetermined energy level from the electromagnetic energy reflected from the object in the electromagnetic field, whereby a reading is provided as to the size of the object versus the distance of the object from the apparatus.

The present invention may be employed as a field disturbance and/or interruption sensor Either the presence or absence of objects can be detected.

An object of the present invention is the ability to manufacture economically object detection apparatus without sacrificing accuracy or versatility.

A feature of the present invention is the selective mating of transmitters and receivers through frequency matching, wereby zone, spatial, side-by-side and independent detection can be achieved without interference among units, overlap or signal spillage.

Another feature of the present invention is the employment of side lobe suppression to reduce the injection or coupling of a portion of a transmitted signal into a receiving antenna which would result in a false signal.

DESCRIPTION OF THE PRESFERRED EMBODIMENT

Figure 1:
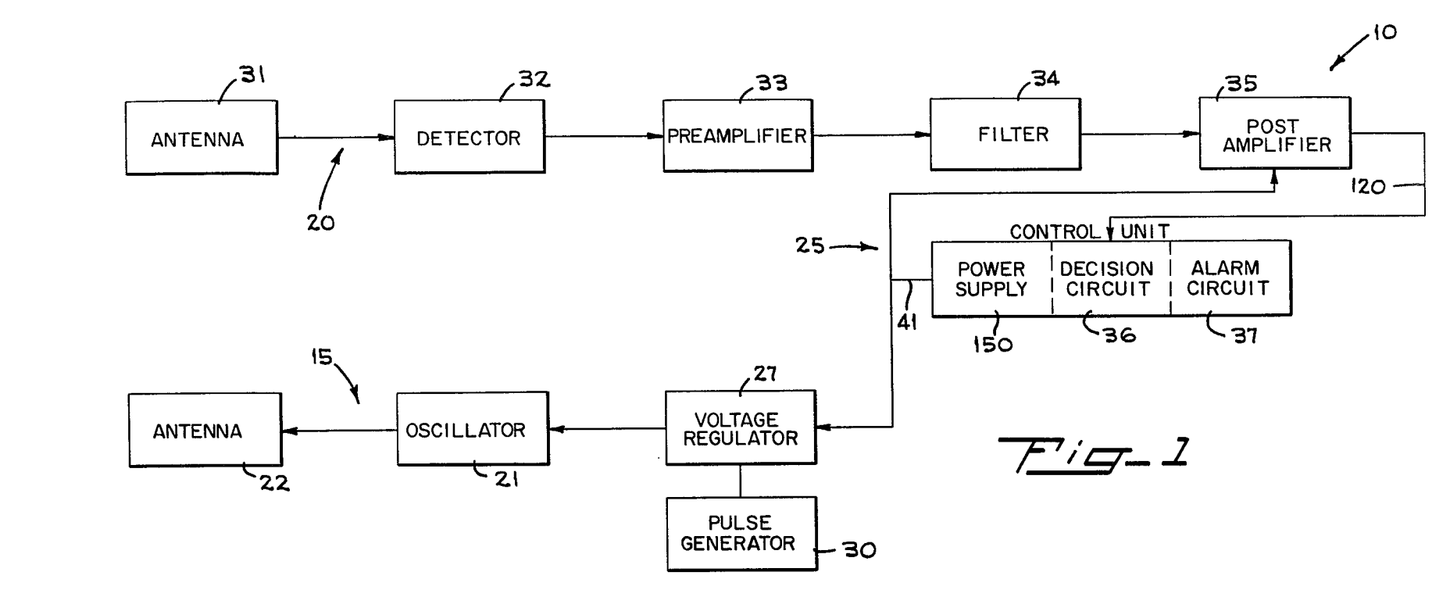
FIG. 1 is a block diagram of the object detection apparatus of the present invention.

Illustrated in FIG. 1 is the apparatus 10 of the present invention for detecting objects. The apparatus 10 comprises a transmitter 15 for propagating a field of electromagnetic energy. In the preferred embodiment, the frequency of the electromagnetic field is in the microwave frequency range. An object disposed in the path of the field of electromagnetic energy reflects, disturbs or interrupts a level of electromagnetic energy representative of the size of the object and the distance of the object from the apparatus 10. A receiver 20 detecting a predetermined level of energy reflected, interrupted or disturbed from the object effects a control operation.

The transmitter 15 emits electromagnetic field in the micro-wave range in the form of pulses and the receiver 20 detects the electromagnetic energy reflected from the object in the path of the electromagnetic field propagated by the transmitter 15. The receiver 20 reduces the detected electromagnetic energy to a pulse energy level and passes the pulse energy of a predetermined frequency. When the pulse energy reaches a predetermined energy level, the receiver 20 activates an alarm through a control unit 25.

The transmitter 15 includes a suitable oscillator 21, which in the exemplary embodiment is a Gunn diode oscillator generating a 10.525 Geiga-hertz output. The oscillator 21 is pulse modulated by applying the supply voltage thereto at a preselected pulse rate. Thus, the output of the oscillator 21 is a continuous square wave with preferably a 50% duty cycle. A suitable antenna 22, such as a microwave guide or a horn antenna, is connected to the output of the oscillator 21 to propagate in front of its radiator a field of electromagnetic energy in the microwave range in the form of pulses.

For operating the oscillator 21 for the emission of an electromagnetic field in the microwave range in the form of pulses, the application of supply voltage to the oscillator is controlled. Toward this end, a source of direct current voltage is made available from the control unit 25. The supply voltage passes through a voltage regulator 27 for application to the Gunn diode oscillator 21. A pulse generator 30 controls the voltage regulator 27 for applying the supply voltage to the Gunn diode at a preselected pulse rate. The pulse frequency is adjustably controlled by the pulse generator 30. The amplitude of the supply voltage is adjusted to the required operating voltage for the oscillator 21 by the voltage regulator 27.

An object in the path of the electromagnetic field propagated from the antenna 22 causes a level of electromagnetic energy to be reflected toward the receiver 20 or causes a field disturbance or interruption of the electromagnetic field. The reflected, disturbed or interrupted level of electromagnetic energy is dependent on the size of the object and the distance of the object from the apparatus 10. The receiver 20 includes a suitable microwave or horn antenna 31 which senses the reflected, disturbed or interrupted electromagnetic energy from the object. Connected to the output of the antenna 21 is a detector 32, which serves to remove the reflected, disturbed or interrupted pulse energy from the electromagnetic energy in the microwave frequency range. This is done by passing only the pulse component of the electromagnetic energy and by rejecting the microwave component of the electromagnetic energy.

The pulse energy is then amplified by a pre-amplifier 33. Connected to the output of the pre-amplifier 33 is a narrow bandwidth piezoelectric filter 34. The filter 34 is preselected to pass only pulse energy of a frequency that is of the same pulse fequency as the output of the pulse generator 30. Stated otherwise, the band-pass filter 34 is selected to pass only a pulse energy having the same frequencey as the pulse frequency of the supply voltage applied to the oscillator 21. All other frequencies are rejected by the filter 34. The bandwidth of the filter 34 is in the order of 0.4% maximum. In this manner the transmitter 15 and the receiver 20 are tuned to the same pulse frequencies for coacting or mating as a unit.

The pulse energy passing through the filter 34 is amplified by a post amplifier 35. Connected to the output of the post amplifier 35 is the control unit 25, which includes a decision circuit 36 and an alarm circuit 37. When the pulse energy reaches a predetermined level, the decision circuit 36 operates the alarm circuit 37.

For having the transmitter 15 and the receiver 20 coacting or mating as a unit at another frequency or for having the transmitter 15 coacting with another receiver or for having the receiver 20 coact with another transmitter, the frequency of the pulse generator 30 of the transmitter 15 can be varied and the frequency of the filter 34 of the receiver 20 can be varied. The frequency of the pulse generator 30 is preselected by the insertion of a piezoelectric resonator 70 of the desired frequency in the feedback circuit of the pulse generator 30. A piezoelectric filter of the desired frequency can be substituted for the piezoelectric filter 34. The use of a piezoelectric filter provides a very high gain- narrow bandwidth and, hence, a very good signal to noise ratio.

Figure 2:
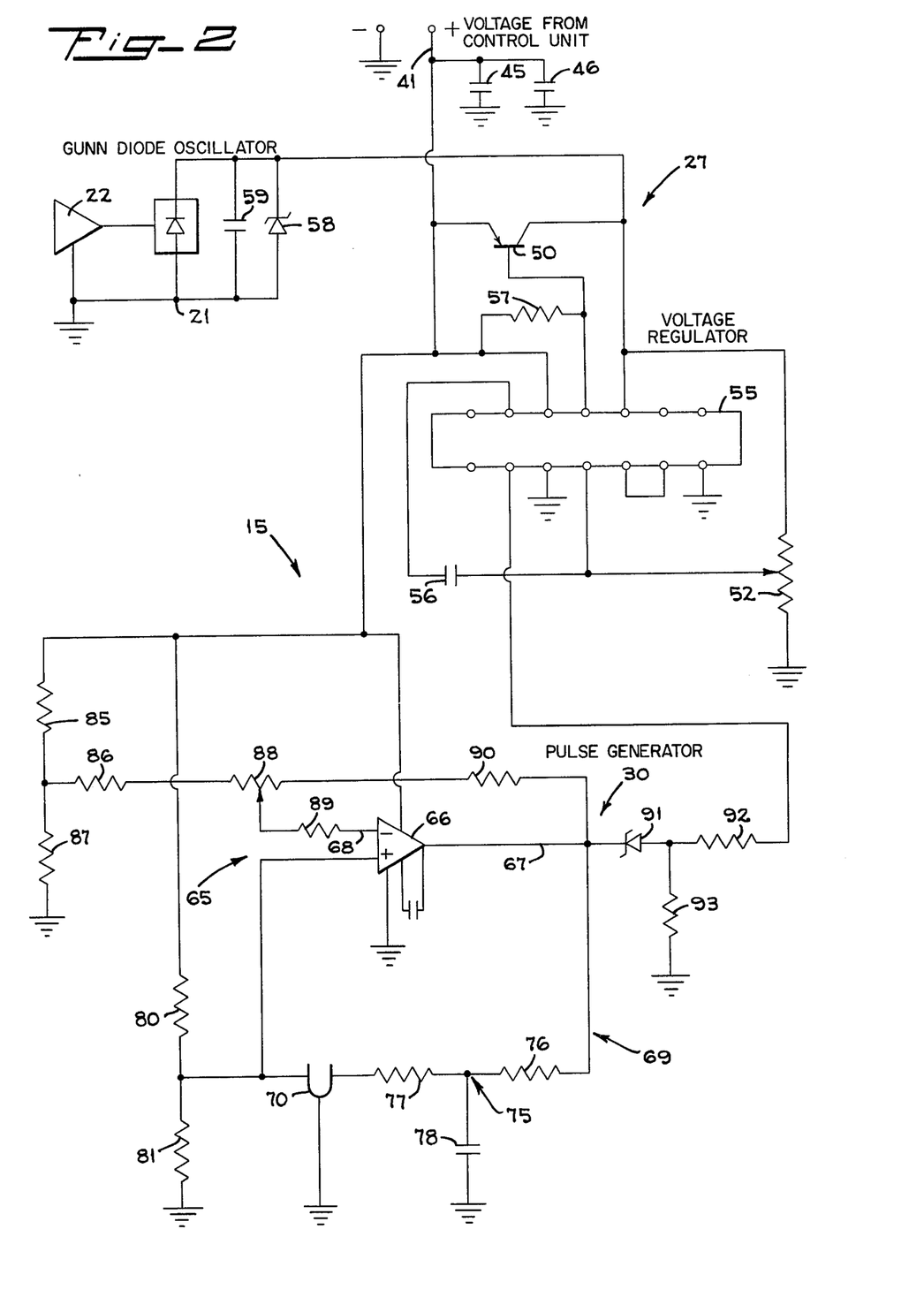
FIG. 2 is a schematic diagram of a transmitter employed in the apparatus shown in FIG. 1.

In FIG. 2 is illustrated the transmitter 15. A source 40 of direct current supply voltage is made available to the transmitter 15 from the control unit 25 (FIG. 4) over a conductor 41 and through a fuse 42 in a manner described hereinafter. A high frequency capacitor 45 (FIG. 2) and a low frequency capacitor 46 serve as by-pass capacitors to remove any pulses or ripples that may be present over the power supply conductor by by-passing the same to ground. The direct current supply voltage is applied to the voltage regulator 27.

The voltage regulator 27 comprises a suitable power transistor, such as the 2N6123, through which a regulated supply voltage is applied to the Gunn diode oscillator 21. For regulating the supply power transistor 50, a variable resistor 52 has the supply voltage appearing thereacross applied to an operational amplifier within an integrated circuit 55, such as a uA723DN, through a suitable by-pass capacitor 56. The output of the integrated circuit 55 is applied across a biasing resistor 57 for the power transistor 50. When a desired regulated supply voltage of an adjusted magnitude is present, the power transistor 50 conducts to apply a regulated supply voltage of an adjusted magnitude to the Gunn diode oscillator 21.

Figure 5:
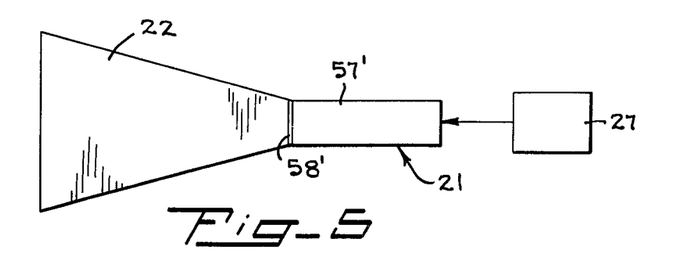
FIG. 5 is a diagrammatic illustration of an oscillator resonator mounted on an antenna employed in the transmitter shown in FIG. 2.

The Gunn diode oscillator 21 includes a microwave cavity resonator 57' (FIG. 5) connected to a waveguide flange 58' of the antenna 22 and when the Gunn diode oscillator 21 is applied with the proper operating supply voltage, the oscillator 21 oscillates in the negative conductance region. As a consequence thereof, microwave energy is applied to the antenna 22 for the propagation into space of an electromagnetic field. A Zener diode 58 protects the Gunn diode oscillator 21 against excessive voltages in the event of breakdown or failure of the voltage regulator 27. A capacitor 59 by-passes spurious oscillations which may arise in the oscillator 21.

The pulse generator 30 determines the pulse rate at which the supply voltage is applied to the oscillator 21 through the voltage regulator 27. Toward this end, the pulse generator 30 comprises an oscillator 65. An amplifier 66 of the oscillator 65 has its output circuit 67 connected to its input circuit 68 through a feedback circuit 69. The feedback circuit 69 includes the piezoelectric resonator 70. The oscillator 65 generates an r.f. signal only at the preselected frequency of the piezoelectric resonator 70. Thus, the frequency of the oscillations of the pulse generator 30 can be varied or selected by the frequency of the piezoelectric resonator 70. The oscillator 65 operates when transient signals trigger the amplifier 66.

A filter circuit 75 for the resonator 70 comprises resistors 76 and 77 and a capacitor 78. Resistor 80 and 81 form a voltage divider for setting the positive input voltage to be applied to the amplifier 66 for operating the oscillator 65. The negative input voltage required for operating the oscillator 65 is set by the voltage divider including the resistors 85, 86 and 87. The negative feedback for the oscillator 65 is set by resistor 88, 89 and 90. A Zener diode 91 reduces the output voltage of the pulse generator 30 through resistor 92 and 93 to zero so that the base of the output pulses of the pulse generator 30 is zero rather than at an elevated level. In this manner, a positive turn-off voltage is assured for the Gunn diode oscillator 21. The output of the pulse generator 30 is fed to the voltage regulator 27. The "on" pulses of the pulse generator 30 cause the voltage regulator 27 to turn off the Gunn diode oscillator 21 at the pulse rate to produce a square wave output for the Gunn diode oscillator 21.

Figure 3:
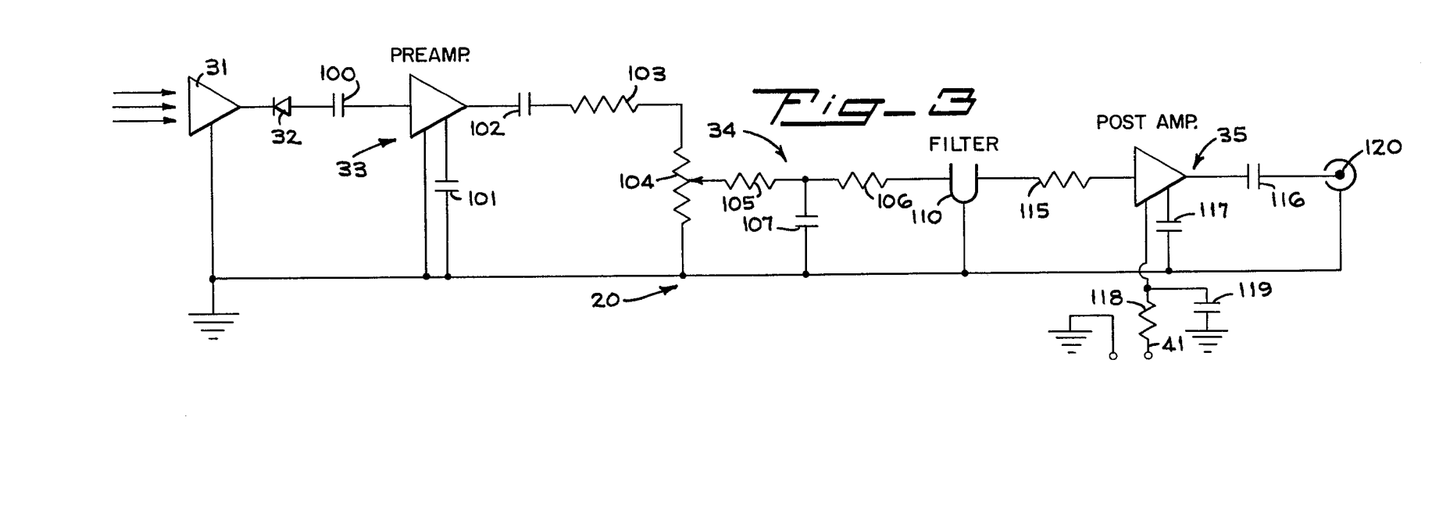
FIG. 3 is a schematic diagram of a receiver employed in the apparatus shown in FIG. 1.

Illustrated in FIG. 3 is the receiver 20, which comprises the antenna 31. The antenna 31 amplifies the pulse modulated electromagnetic energy detected by it. Connected to the output of the antenna 31 is the detector 32, which in the exemplary embodiment is a 1N23C cystal detector. The detector 32 (FIG. 6) includes a microwave cavity resonator 95 connected to the waveguide flange 96 for the antenna 31. The detector 32 passes only the pulse energy segment of the reflected, disturbed or interrupted electromagnetic energy and removes the microwave frequency segment of the reflected, disturbed or interrupted electromagnetic energy.

Figure 6:
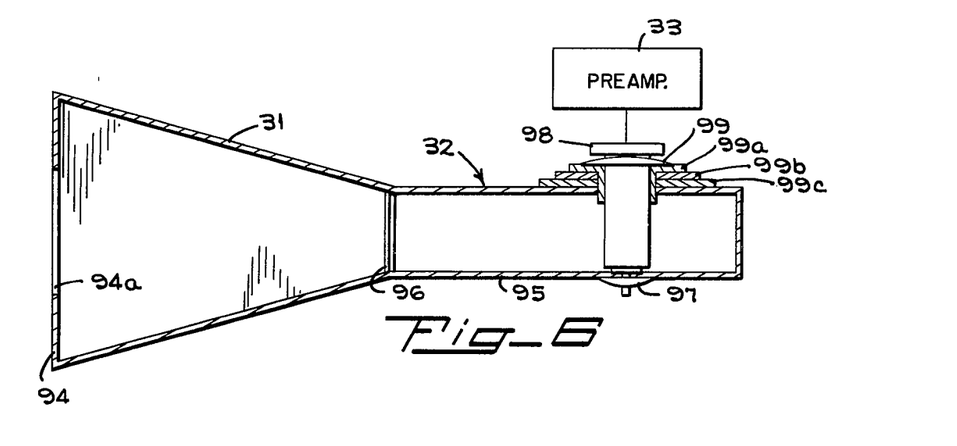
FIG. 6 is a diagrammatic illustration of a detector and antenna employed in the receiver shown in FIG. 3.

More particularly, the detector 32 includes a crystal 98, such as a 1N23C crystal, which is mounted on the waveguide cavity resonator 95 through a fastener 97. Additionally, the detector 32 includes a plastic insulator 99a, capacitive r.f. by-pass plate 99b, and a dielectric sheet 99c held on the cavity resonator 95 by a spring clip 99.

Figure 7:
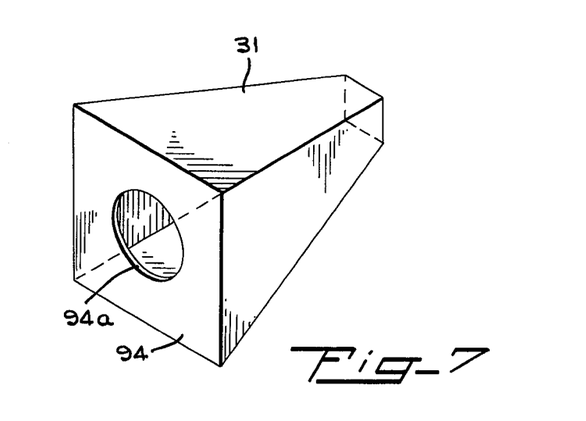
FIG. 7 is a perspective diagrammatic illustration of an apertured plate employed in conjuction with the antenna of the receiver for providing side lobe suppression.

To avoid false readings by injection or coupling of a portion of a transmitted signal to the receiver 20 from an adjacent or contiguous transmitter, side lobe suppression is provided for the antenna 31. Toward this end, an apertured plate 94 (FIG. 7) is mounted on the front of the resonator of the antenna 31. The plate 94 may or may not be insulated from the antenna 31 dependent upon the surface current on the surrounding enclosure. A suitable opening 94a is provided in the apertured plate 94.

The pulse energy is fed through a capacitor 100, which provides decoupling of direct current for the pre-amplifier 33. The pre-amplifier 33 in the exemplary embodiment amplifies the pulse energy from 100 to 100,000 times. A capacitor 101 sets the amplifier gain and serves as a by-pass capacitor. A capacitor 102 provides isolation, while resistors 103 and 104 serve as a voltage divider to adjust the level of the output pulse energy of the pre-amplifier 33.

Connected to the output of the pre-amplifier 33 is the filter 34, which comprises resistors 105 and 106 and a capacitor 107. Additionally, the filter 34 includes a piezoelectric resonator 110. The filter 34 passes narrow bandwidth pulse energy, preferably within a 0.3% bandwidth. If the pulse signal is of the predetermined pulse frequency, it is passed by the filter 34. The pulse frequency of the filter 34 to be passed can be varied by replacing the piezoelectric resonator to a desired selected pulse frequency. The pulse frequency of the piezoelectric resonator 110 is selected to be the same as the pulse frequency of the transmitter piezoelectric resonator 70 (FIG. 2). Thus, the receiver 20 coacts with the transmitter 15 to perform as a unit.

The output of the filter 34 is fed to the post amplifier 35, which includes an impedance matching resistor 115 for maximum transfer of energy. A capacitor 116 provides d.c. decoupling to a load. A capacitor 117 sets the amplifier gain for the post amplifier 35. Resistor 118 and a capacitor 119 provide a decoupling filter for preventing pulse energy in the power conductor 41 from reaching the amplifier 35. The output of the post amplifier 35 is fed to the control circuit 25 over a conductor 120.

Figure 4:
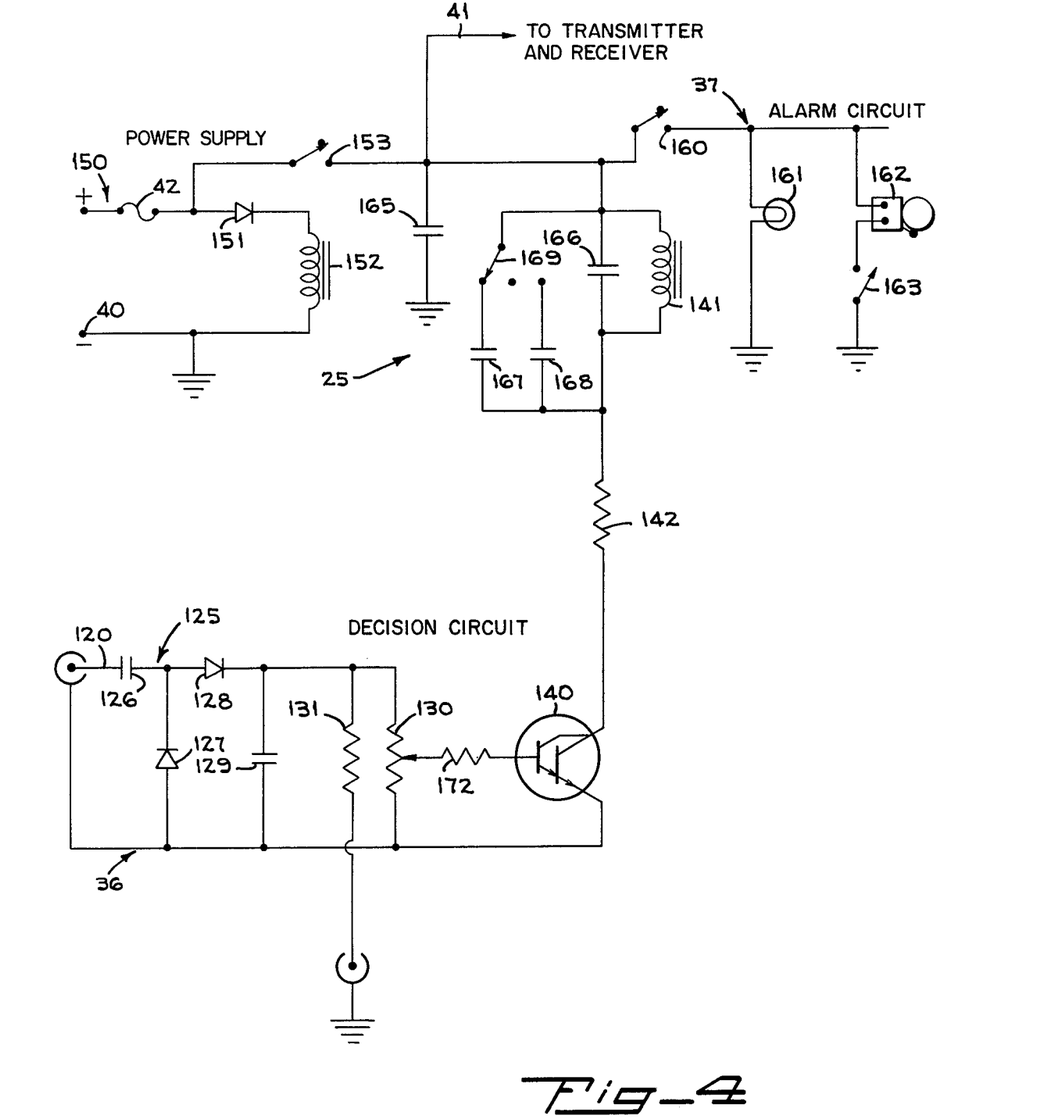
FIG. 4 is a schematic diagram of a control unit employed in the apparatus shown in FIG. 1.

In FIG. 4 is illustrated the control unit 25, which comprises the decision circuit 36. In the decision circuit 36 is a modified voltage doubler 125 which includes capacitors 126 and 129 and diodes 127 and 128. The modified voltage doubler 125 rectifies the pulse energy on the conductor 120. The direct current voltage is applied to a variable load resistor 130. A resistor 131 is a meter range set resistor for a test meter.

The variable resistor 130 is adjusted to set the threshold voltage for the activation of the alarm circuits 37. The voltage appearing across the load resistor 130 is fed to a Darlington transistor 140 through a base resistor 172. When the prescribed voltage is applied to the base of the transistor 140, the transistor 140 is turned "on" and performs as a switch. The conduction of the transistor 140 causes a relay 141 to be energized over a path including a resistor 142 in a manner to be described hereinafter. The resistor 142 serves to protect the transistor 140 against high current flow.

A power supply 150 includes the source 40 of direct current voltage and the fuse 67. Additionally, the power supply 150 comprises a diode 151 and a relay 152. When the voltage is of the correct polarity, current will flow through the diode 151 to energize the relay 152. If the voltage is not of the correct polarity, current does not flow through the diode 151 to energize the relay 152. The energization of the relay 152 closes contacts 153 to complete a path for direct current voltage over the conductor 41 for application to the transmitter 15, and receiver 20 and the control unit 25.

When the transistor 140 is "on" and the contacts 153 are closed, the relay 141 is energized through the power supply 150 by way of the closed contacts 153. The energization of the relay 141 closes contacts 160 to complete an operating circuit for a lamp 161 and a buzzer 162 in the alarm circuit 37 through the power supply 150 by way of the contacts 153. A manually operated switch 163 enables the lamp 161 to be illuminated without the presence of an audible alarm.

A capacitor 165 is a by-pass capacitor for the power conductor 41. A capacitor 166 provides a time delay in the energization of the relay 141 to inhibit false operations of the alarm circuit 37 arising out of simple noise or erroneous pulses. Capacitors 166, 167 and 168 provide a time delay for the deenergization of the relay 141 to enable the alarm circuit 37 to remain operated after the object is removed from the electromagnetic field. A switch 169 enables an operator to select the time delay period for the deenergization of the relay 141.

Figure 8:
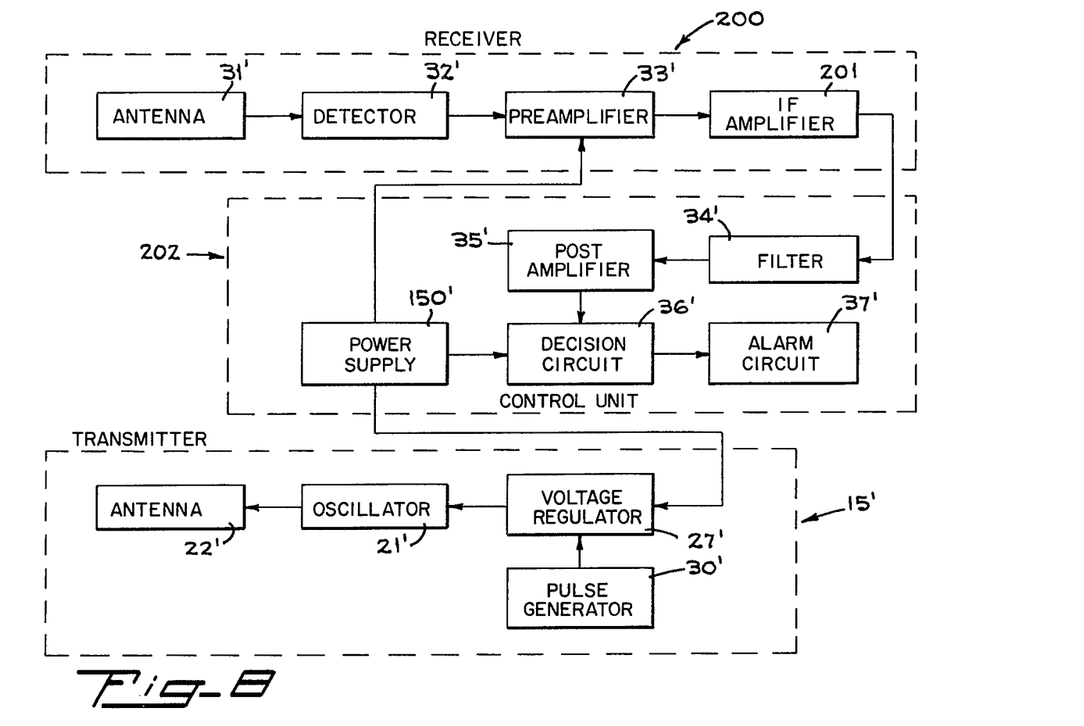
FIG. 8 is a block diagram of a modification of the object detection apparatus shown in FIG. 1 illustrating one of the transmitters and receivers for providing spatical coverage.
Figure 9:
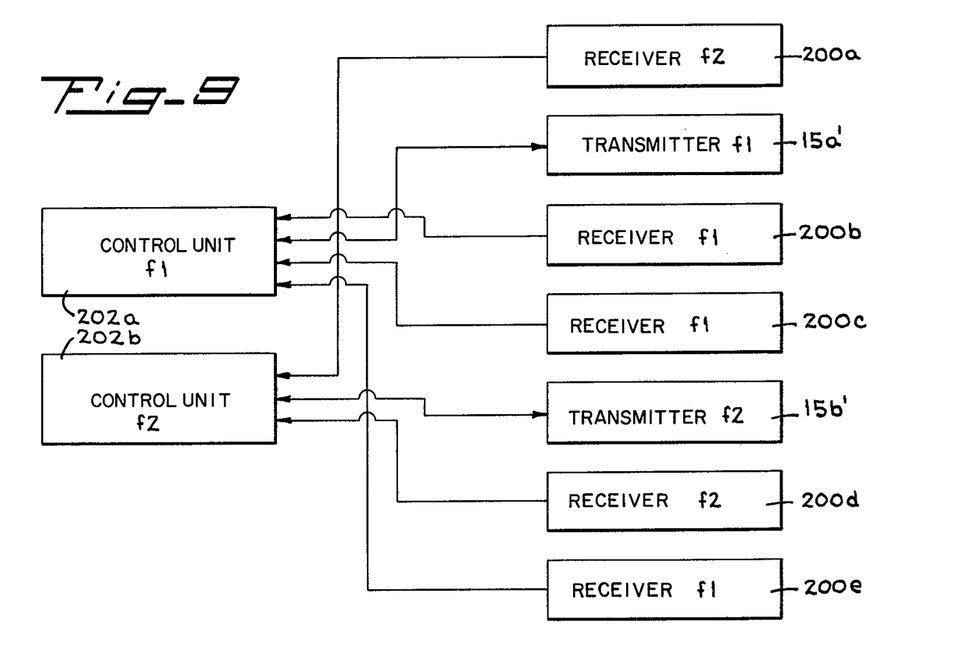
FIG. 9 is a block diagram of a plurality of the transmitters and receivers shown in FIG. 8 for providing spatial coverage.

It is within the contemplation of the present invention to employ well-known module techniques for housing mating receivers and transmitters. For sensing areas or for obtaining spatial coverage, a plurality of receivers and transmitters are employed as illustrated in FIGS. 8 and 9. Each transmitter 15' has similar construction and operation as the transmitter 15 of FIG. 1. Therefore, the same reference numeral has been applied to the corresponding component with the addition of a prime.

Each receiver 200 includes an antenna 31', a detector 32' and a pre-amplifier 33' which is similar in operation and construction as the antenna 31, the detector 32 and the pre-amplifier 33 of the receiver 20 (FIG. 1). However, each receiver 200 now includes a conventional I.F. amplifier 201 to provide capability and gain for a control circuit 202 to acccept a plurality of input signals.

Each control circuit 202 now includes a post amplifier 35, a filter 34', a decision circuit 36', an alarm circuit 37' and a power supply 150'. the post amplifier 35' and the filter 34' are constructed and operate in a manner similar to that described for the post amplifier 35 and the filter 34 of the receiver 15. The decision circuit 36', the alarm circuit 37', and the power supply 150 ' are constructed and operate in a manner similar to that described for the decision circuit 36, the alarm circuit 37 and the power supply 150 of the control circuit 25 (FIG.1).

Each transmitter 15' is arranged to cover a different predetermined section of a designated area. Similarly, each receiver 200 is arranged to cover a different predetermined section of a designated area. Transmitter 15a' propagates an electromagnetic field at a modulating frequency $f_1$ and the transmitter 15b propagates an electromagnetic field at a modulating frequency $f_2$. The receivers 200a – 200e will receive any reflected, interrupted or disturbed signal that the location of its associated antenna is in position to detect. The filter of the control circuit 202a will pass only a demodulated $f_1$ frequency signal and reject all others. The filter of the control circuit 202b will pass only a demodulated $f_2$ frequency signal and reject all others. When either receiver 200b, 200c or 200e detect a signal with a demodulated frequency $f_1$ above a predetermined level of energy, the alarm of the control circuit 202a will be operated. When either the receiver 200a or 200d detect a signal with a demodulated frequency $f_2$ above a predetermined energy level, the alarm of the control circuit 202b will be operated. By having a plurality of such arrangements, an area can be sensed or spatial coverage can be obtained.

By employing different modulating frequencies, different zones in the same area can be identified without excessive signal spillage or overlap amoung different zones. Additionally, separate units can be used side-by-side without excessive interference.

Electromagnetic energy may be distrubed or interrupted when a transmitter and a receiver are directed toward one another an an object therebetween disturbs or interrupts the field of electromagnetic energy between the receiver and the transmitter. Electromagnetic energy may be reflected when the transmitter is directed toward an object and the receiver detects the electromagnetic energy reflected from the object.

We claim:
1. Apparatus for detecting an object comprising:
A. a transmitter propagating a field of electromagnetic energy emitted in the form of pulses, said transmitter comprising:
  a. means for applying a supply voltage,
  b. an oscillator for generating electromagnetic energy in responnse to said means applying supply voltage to said oscillator,
  c. an antenna connected to said oscillator for propagating a field of electromagnetic energy, and
  d. a pulse generator connected to said means for applying supply voltage to said oscillator at a pulse rate for the emission of the field of electromagnetic energy in the form of pulses, said pulse generator including a piezoelectric resonator for selecting the pulse rate at which said transmitter emits the field of electromagnetic energy;
B. a receiver detecting the level of electromagnetic energy influenced by an object in the path of said field of electromagnetic energy for providing a level of pulse energy, said receiver comprising:
  a. a detector for removing pulse energy from the electromagnetic energy influenced by the object in said field,
  b. a filter for passing only the pulse energy of a predetermined frequency, said filter including a piezoelectric resonator for selecting said predetermined frequency said predetermined frequency passed by said filter being the same as said pulse rate at which said transmitter emits the field of electromagnetic energy, and
  c. an amplifier connected to said filter for providing a voltage representative of said level of pulse energy;

C. a control circuit connected to said amplifier of said receiver for producing an alarm-activating signal in response to said voltage reaching a predetermined magnitude; and D. an alarm circuit connected to said control circuit and activated by said control circuit producing the alarm-activating signal.

2. Apparatus for spatial detection comprising:

a. a plurality of transmitters propagating fields of electromagnetic energy at different modulating frequencies and at different locations;

b. a plurality of receivers detecting respectively the level of electromagnetic energy influenced by at least one object in the path of said fields of electromagnetic energy, said receivers being located at different locations;

c. a plurality of control circuits, each of said control circuits being connected to selected ones of said receivers for producing an alarm-activating signal in response to the energy detected by one or more of its associated receivers reaching a predetermined level; and d. an alarm circuit for each of said control circuits, said alarm circuits being connected to said control circuits respectively and activated by its associated control circuit producing an alarm- activating signal in response to the energy detected by an associated receiver reaching the predetermined level.

3. Apparatus for spacial detection as claimed in claim 2 wherein each of said control circuits includes means for operating its associated alarm circuit in response to at least one of its associated receivers detecting electromagnetic energy at a selected demodulated frequency above the predetermined level.

4. Apparatus for spatial detection as claimed claim 3 in which the respective selected demodulated frequencies correspond to the modulating frequencies of said transmitters, respectively.

5. Apparatus for spatial detection as claimed in claim 4 in which each of said transmitters includes an antenna.

6. Apparatus for spatial detection as claimed in claim 4 in which each of said receivers includes an antenna.

7. Apparatus for spatial detection as claimed in claim 5 in which each of said receivers includes an antenna.

* * * * *